(12) United States Patent
Lister

(10) Patent No.: US 11,266,127 B2
(45) Date of Patent: Mar. 8, 2022

(54) METHOD AND APPARATUS FOR A SUPPLEMENTAL SPRING LOADED FEEDER

(71) Applicant: UNIVERSITY OF TENNESSEE RESEARCH FOUNDATION, Memphis, TN (US)

(72) Inventor: Mark Andrew Lister, Martin, TN (US)

(73) Assignee: UNIVERSITY OF TENNESSEE RESEARCH FOUNDATION, Memphis, TN (US)

( * ) Notice: Subject to any disclaimer, the term of this patent is extended or adjusted under 35 U.S.C. 154(b) by 238 days.

(21) Appl. No.: 16/821,753

(22) Filed: Mar. 17, 2020

(65) Prior Publication Data

US 2020/0214269 A1  Jul. 9, 2020

Related U.S. Application Data

(63) Continuation of application No. PCT/US2018/056699, filed on Oct. 19, 2018.

(60) Provisional application No. 62/575,110, filed on Oct. 20, 2017.

(51) Int. Cl.
*A01K 39/012* (2006.01)

(52) U.S. Cl.
CPC ................ *A01K 39/012* (2013.01)

(58) Field of Classification Search
CPC .... A01K 39/00; A01K 39/01; A01K 39/0106; A01K 39/012; A01K 39/0125
See application file for complete search history.

(56) References Cited

U.S. PATENT DOCUMENTS

| | | | |
|---|---|---|---|
| 2,983,505 A | 5/1961 | Hanslip | |
| 3,330,585 A | 7/1967 | Pollin | |
| 3,845,928 A | 11/1974 | Barrett et al. | |
| 4,382,630 A | 5/1983 | Weston | |
| 4,476,811 A | 10/1984 | Swartzendruber | |
| 4,488,509 A | 12/1984 | Awalt | |
| 4,815,417 A | 3/1989 | Strong | |
| 4,850,242 A | 7/1989 | Hass et al. | |

(Continued)

FOREIGN PATENT DOCUMENTS

| | | |
|---|---|---|
| NL | 2001841 C2 | 3/2010 |
| WO | 2015175940 A1 | 11/2015 |

(Continued)

OTHER PUBLICATIONS

Chore-Time "Flex-Auger Fill Systems" Sep. 11, 2017; retrieved from the internet <http://www.choretime.com/FLEX-AUGER-Fill-Systems-4.com>.

(Continued)

*Primary Examiner* — Trinh T Nguyen
(74) *Attorney, Agent, or Firm* — Greensfelder, Hemker & Gale, P.C.; Mark E. Stallion

(57) ABSTRACT

An apparatus and method is described for a supplemental feeder system that provides a spring loaded supplemental feeder mounted on and spaced along a feed line. The spring loaded supplemental feeder acts as control that controls one or more follower supplemental feeders that is attached to control the one or more distally space apart supplemental feeders to dispense feed. The apparatus includes a pair of left and right annular collar clamps spaced apart and a tubular collar coaxial with respect to the left and right annular collar clamps and rotationally attached to the left and right annular collars. An extension tube having an interior extension channel is communicably attached to an interior channel of the tubular collar.

20 Claims, 12 Drawing Sheets

(56) References Cited

U.S. PATENT DOCUMENTS

| | | | |
|---|---|---|---|
| 5,340,068 | A | 8/1994 | Sarkisian et al. |
| 6,532,895 | B1 | 3/2003 | Andersen |
| 9,392,772 | B2 | 7/2016 | Steudler, Jr. et al. |
| 2003/0056730 | A1 | 3/2003 | Corti et al. |
| 2004/0244705 | A1 | 12/2004 | Momont et al. |
| 2016/0073615 | A1 | 3/2016 | Van Kerrebroeck |

FOREIGN PATENT DOCUMENTS

| | | |
|---|---|---|
| WO | 2016154128 A1 | 9/2016 |
| WO | 2019079712 A1 | 4/2019 |

OTHER PUBLICATIONS

Farmer Boy AG "Flex-Flo Kwik Attach Drop Kits" Sep. 11, 2017; retrieved from the internet <http://www.farmerboyag.com/Flex-Flo-Kwik-Attach-Drop-Kits.com>.

GSI:EAME "Pan Feeding System" Sep. 11, 2017; retrieved from the internet <http://gsieame.com/poultry-solutions/equipment/feeding-watering-systems/pan-feeding-sys.com>.

Lange Ag Systems, Inc. "AP Flex-Pro Feed Delivery Systems" Sep. 11, 2017; retrieved from the internet <http://www.langeagsystems.com/flexflo_systems.html>.

QC Supply "Nylno Outlet Drop—For Model 90 & HMC" Sep. 11, 2017; retrieved from the internet <https://www.qcsupply.com/q43490c-nylon-outlet-drop-for-model-90-hmc.html>.

US International Searching Authority, PCT International Search Report and Written Opinion, dated Jan. 4, 2019; pp. 1-16.

GSI:EAME "Flex-Flo" Sep. 11, 2017; retrieved from the internet <http://gsieame.com/swine-solutions/equipment/feed-delivery/flex-flo/>.

Thepoultryhut "Feeding Systems" Sep. 11, 2017; retrieved from the internet <http://www.thepoultryhut.co.uk/product-range/feeding-systems>.

Chore-Time "E-Z Start Feeder" Sep. 11, 2017 retrieved from the internet <http://www.choretime.com/E-Z-START-Feeder>.

METHOD AND APPARATUS FOR A SUPPLEMENTAL SPRING LOADED FEEDER

CROSS-REFERENCE TO RELATED APPLICATIONS

The present application claims priority to, and the benefit of PCT International Patent Application No. PCT/US2018/056699 and U.S. Provisional Patent Application No. 62/575,110 filed Oct. 20, 2017, the contents of which are incorporated herein by reference.

BACKGROUND

Field

This technology as disclosed herein relates generally to bird feeders and, more particularly, to supplemental poultry feeders.

Background

A poultry house structure is typically an elongated structure that may extend several hundred feet. The poultry houses are used to grow poultry until they are of the weight and size for market. The houses are equipped with automated nourishment systems that provide feed and water. The automated nourishment system typically includes feed delivery lines or tubes as well has water lines or tubes that run along the length of the poultry house and there may be multiple rows of these nourishment lines that extend along the length of the house. Along the length of the nourishment delivery lines are spaced apart nourishment stations that are communicably connected to the nourishment delivery lines. Feed is pushed to flow through the feed lines and is dispensed at each nourishment feed station and water is pushed to flow through the water lines and is dispensed at each nourishment watering station. The nourishment feed station can include a feed pan/trough assembly that has an integral hollow tube or conduit that is communicably connected to the feed line such that feed from the feed line is dispensed through the integral hollow tube of the feed pan assembly and channeled to fall into the feed pan where the bird can access the feed.

The feed lines and watering lines and the associated attached nourishment stations are typically lowered from above toward the floor of the house whereby the nourishment station is appropriately spaced up vertically a distance from the floor of the house such that a bird during the growing process can access the feed. However, the nourishment stations are not necessarily lowered completely to contact the floor, in which case a less mature bird such as a day old chick may have difficulty in accessing feed. Further, the feed pan typically has a vertical side wall extending from the pan base such that even if the trough were lowered completely to the floor, a day old chick still may have difficulty accessing the feed. To resolve this problem, supplemental feeder assemblies have been utilized that are spaced along the length of the feed line. The supplemental feeder assemblies are essentially tube assemblies that are communicably attached to the feed line that operate similar to a valve in that they receive a flow of feed there through when the supplemental tube is directed to point vertically downward toward the floor whereby the opening of the supplemental tube adjacent the feed line aligns with an opening in the feed line through which feed is allowed to flow through the supplemental tube. The supplemental tube channels a flow of feed to fall to the floor of the house or into a feeder pan whereby a day old chick can access the feed that falls to the floor or into the pan. Also, the supplemental feeders allow the operator to selectively increase the amount of feed being provided when the bird population dictates such. When the bird population is high, an operator can selectively turn on the supplemental feeders in order to provide a larger volume of feed.

However, there are problems with the existing supplemental feeders. Although the supplemental feeders can be placed in the feed dispensing vertical position before chicks are present and before being lowered to floor level, returning the supplemental feeders to the non-dispensing horizontal position requires an operator to stoop over and manually rotate hundreds or thousands of individual feeders which are now at ground level in a hot, humid, crowded poultry house. Additionally, existing supplemental feeders are not default biased to an "off", or non-dispensing" position. Even after being rotated by the operator to a non-dispensing position, a bird, especially when they are larger and more mature, may accidentally nudge the supplemental feeder and return it to the dispensing position. This will immediately allow feed to flow, spilling wastefully onto the floor of the poultry house and lowering the feed conversion rate that is a primary measure of productivity for poultry farmers.

A more efficient apparatus and method is needed for operation of a supplemental feeder in a poultry house. The following description provides a potential solution to the problem of meeting the nourishment need of the smaller bird.

SUMMARY

The technology as disclosed herein includes a method and apparatus for operating a supplemental feeder in a poultry house. An apparatus and method is described herein for a supplemental feeder system that provides a spring loaded control supplemental feeder. One implementation of the technology includes placing one or more control supplemental spring loaded feeder devices spaced along a feed line, and for one implementation of the device it is default biased to an "off", or non-dispensing" position. By mounting one or more of the spring loaded feeder devices along the feed line, an operator doesn't have to bend over to switch the supplemental feeder on and off. An operator can merely actuate the pedal lever by depressing with their foot or a pole or other implement to return the supplemental feeder to an "OFF" position. The apparatus can include a pair of left and right annular collar clamps spaced apart providing a gap there between and a tubular collar coaxial with respect to the left and right annular collar clamps and rotationally attached to the left and right annular collars to rotate about a co-axis of the tubular collar and the collar clamp. For one implementation, the tubular collar is spring loaded with a tension spring in a first rotational direction and has a raised detent protruding from the outer cylindrical surface of the tubular collar for a locking mechanism. For another implementation the tubular collar is torsion spring loaded. For yet another implementation, the detent is recessed in the cylindrical surface of the tubular collar. For yet another implementation a hole through the wall of the tubular collar is used as a locking mechanism. An extension tube having an interior extension channel is communicably attached to an interior channel of the tubular collar.

One implementation of an apparatus and method is described herein for a control supplemental spring loaded feeder system that provides a spring loaded control supplemental feeder that is attached in a manner to control one or more distally space apart follower supplemental feeders to dispense feed. The apparatus can include a pair of left and right annular collar clamps spaced apart providing a gap there between and a tubular collar coaxial with respect to the left and right annular collar clamps and rotationally attached to the left and right annular collars to rotate about a co-axis of the tubular collar and collar clamps. For one implementation, the tubular collar of the control supplemental feeder is tension spring loaded in a first rotational direction and has a raised detent protruding from the outer cylindrical surface of the tubular collar. For another implementation, the tubular collar is torsion spring loaded. For yet another implementation, the detent is recessed in the cylindrical surface of the tubular collar. For yet another implementation a hole through the wall of the tubular collar is used as a locking mechanism. An extension tube having an interior extension channel is communicably attached to an interior channel of the tubular collar.

One implementation of the supplemental feeder as disclosed and claimed herein includes a pair of left and right annular collar clamps where said left and right annular collar clamps are spaced apart providing a gap there between and where the left annular collar clamp has a right side annular recess adjacent the gap and the right annular collar clamp has a left side annular recess adjacent the gap. One implementation further includes a tubular collar having an interior hollow collar channel and said tubular collar extends across the gap between the left and right annular collar clamps, where said tubular collar has a left detent extending from a left end of the tubular collar into the right side annular recess of the left annular collar and has a right detent extending from a right side of the tubular collar into the left side annular recess of the right annular collar. The tubular collar has a raised detent protruding from the outer cylindrical surface of the tubular collar to resist rotation when engaging a pedal lever. For another implementation, the detent is an indentation recessed in the tubular collar that engages the pedal lever. The detent is illustrated as being raise in the figures of the drawing, however, for one implementation of the detent it is a recessed area. For yet another implementation the locking mechanism is provide with a hole in the wall of the tubular collar.

For one implementation of the supplemental feeder, the pair of left and right clamps are circular segments or arcuate. For one implementation, the circular segments are semicircular. The left and right circular segment collar clamps are spaced apart providing a gap there between and where the left collar clamp has a right side recess adjacent the gap and the right collar clamp has a left side recess adjacent the gap. One implementation further includes a tubular collar having an interior hollow collar channel and said tubular collar extends across the gap between the left and right collar clamps, where said tubular collar has a left detent extending from a left end of the tubular collar into the right side annular recess of the left circular segment collar and has a right detent extending from a right side of the tubular collar into the left side annular recess of the right circular segment collar.

For one implementation, a torsion spring coaxial with respect to the tubular collar, where said torsion spring has a tension rod extending from the torsion spring, which engages the left detent of the collar and urges rotation of the tubular collar in a first rotational direction about the axis of the tubular collar. For one implementation, an extension tube has an interior hollow extension channel, where said extension tube extends perpendicularly from the tubular collar and where the interior hollow extension channel and the interior hollow collar channel communicate. A torsion spring loaded hinge extends between and is fixed between the left and right annular collar clamps, and has a hinge torsion spring, where a tension pin extends from the torsion spring and contacts the collar clamp. Another tension pin extends from the torsion spring to the tubular clamp.

A pedal lever is pivotally attached to pivot about the torsion spring loaded hinge, where the hinge torsion spring has a tension pin contacting the pedal lever and urges rotation of the pedal lever in a second rotational direction opposite of the first rotational direction and causes one end of the pedal lever to engage the raise detent protruding from the outer cylindrical surface of the tubular collar. When the pedal lever engages the raised and prevents rotation, the supplemental feeder is in the ON position allowing feed to flow. When the pedal lever is released, the tubular collar rotate back to the default biased to an "off", or non-dispensing" position. For one implementation of the pedal lever, a hinge torsion spring is not used, but instead, the pedal lever pivotally rotates to a default engagement position to engage the raised detent. For this implementation, the end of the pedal lever end opposite the pedal end is substantially heavier than the pedal end of the pedal lever, to thereby urge the pedal lever to rotate due to gravity to the engagement position.

For another implementation, a tension spring is connected between the tubular collar and the annular collar clamps, where said tension spring has a first hook attached to a tubular collar mount and a distal hook attached to a clamp mount, where the tension spring urges rotation of the tubular collar in a first rotational direction about the axis of the tubular collar. For one implementation an extension tube has an interior hollow extension channel, where said extension tube extends perpendicularly from the tubular collar and where the interior hollow extension channel and the interior hollow collar channel communicate. A pedal lever is pivotally attached to pivot about the torsion spring loaded hinge, where the hinge torsion spring has a tension pin contacting the pedal lever and urges rotation of the pedal lever in a second rotation direction opposite of the first rotational direction and causes one end of the pedal lever to engage the raise detent protruding from the outer cylindrical surface of the tubular collar.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which.

Figure 1:
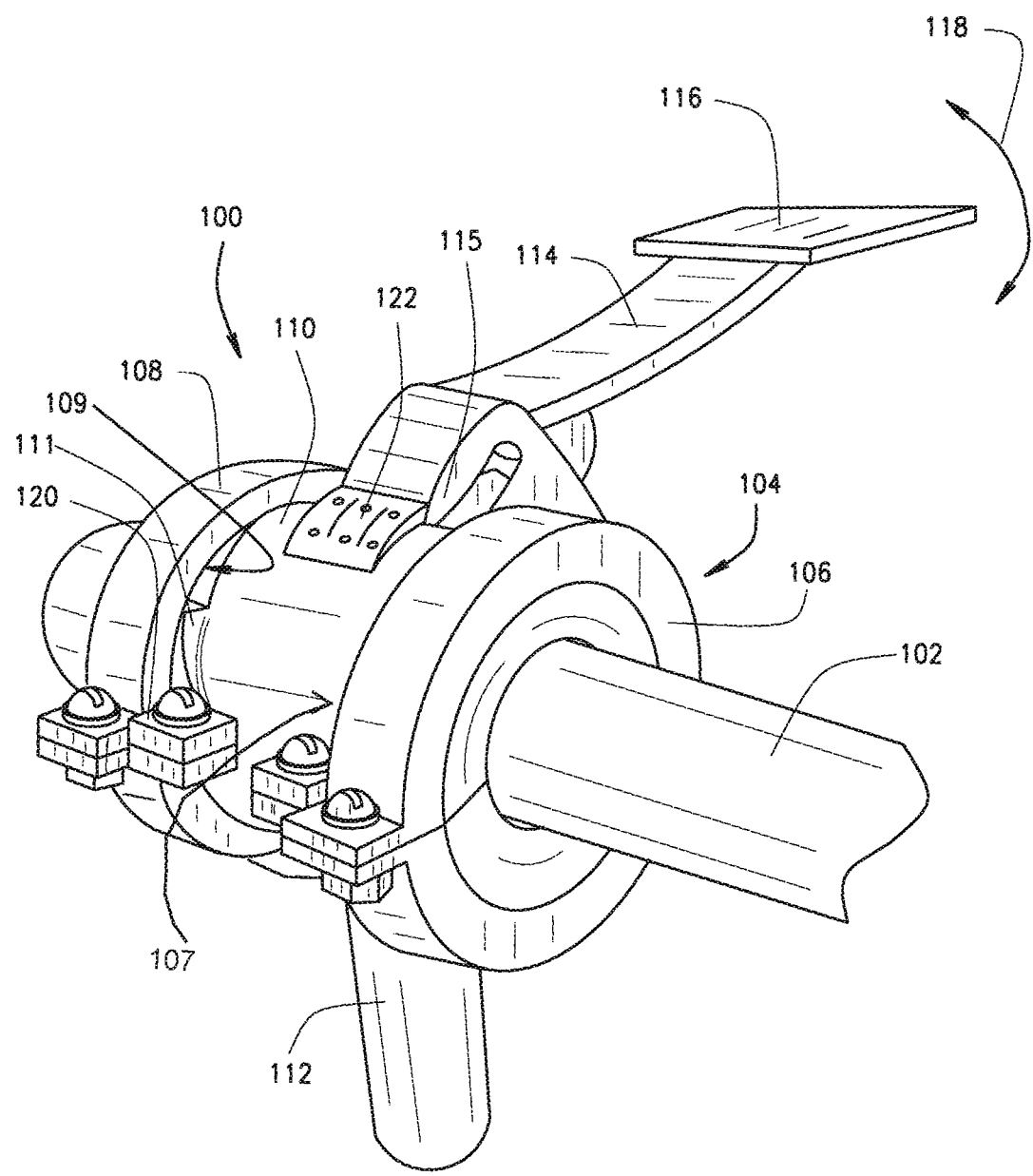
FIG. 1 is an illustration of a control supplemental feeder in the dispense position.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIGS. 1-14 and like reference numerals are being used consistently throughout to refer to like and corresponding parts of the technology for all of the various views and figures of the drawing. Also, please note that the first digit(s) of the reference number for a given item or part of the technology should correspond to the FIG. number in which the item or part is first identified.

One implementation of the present technology as disclosed and claimed includes a spring loaded supplemental feeder, which teaches a novel apparatus and method for providing a supplemental poultry feeder system. One implementation of the supplemental feeder as disclosed and claimed herein includes a pair of left and right annular collar clamps where said left and right annular collar clamps are spaced apart providing a gap there between and where the left annular collar clamp has a right side annular recess adjacent the gap and the right annular collar clamp has a left side annular recess adjacent the gap. One implementation further includes a tubular collar having an interior hollow collar channel and said tubular collar extends across the gap between the left and right annular collar clamps, where said tubular collar has a left detent extending from a left end of the tubular collar into the right side annular recess of the left annular collar and has a right detent extending from a right side of the tubular collar into the left side annular recess of the right annular collar. The tubular collar has a raised detent protruding from the outer cylindrical surface of the tubular collar to resist rotation when engaging a pedal lever. For another implementation, the tubular collar has a detent that is recessed below the outer cylindrical annular collar. For yet another implementation, the tubular collar had a hole there through to engage as a locking mechanism.

For one implementation of the supplemental feeder, the pair of left and right clamps are circular segments or arcuate segments. For one implementation, the circular segments are semi-circular. The left and right circular segment collar clamps are spaced apart providing a gap there between, and where the left collar clamp has a right side recess adjacent the gap and the right collar clamp has a left side recess adjacent the gap. One implementation further includes a tubular collar having an interior hollow collar channel and said tubular collar extends across the gap between the left and right collar clamps, where said tubular collar has a left detent extending from a left end of the tubular collar into the right side annular recess of the left circular segment collar and has a right detent extending from a right side of the tubular collar into the left side annular recess of the right circular segment collar.

For one implementation, a torsion spring is coaxial with respect to the tubular collar, where said torsion spring has a tension rod extending from the torsion spring, which engages the left detent and urges rotation of the tubular collar in a first rotational direction about the axis of the tubular collar. For one implementation an extension tube has an interior hollow extension channel, where said extension tube extends perpendicularly from the tubular collar and where the interior hollow extension channel and the interior hollow collar channel communicate.

A torsion spring loaded hinge extends between and is fixed between the left and right annular collar clamps and has a hinge torsion spring. A pedal lever is pivotally attached to pivot about the torsion spring loaded hinge, where the hinge torsion spring has a tension pin contacting the pedal lever and urges rotation of the pedal lever in a second rotational direction opposite of the first rotational direction and causes one end of the pedal lever to engage the raise detent protruding from the outer cylindrical surface of the tubular collar.

A pedal lever is pivotally attached to pivot about the torsion spring loaded hinge, where the hinge torsion spring has a tension pin contacting the pedal lever and urges rotation of the pedal lever in a second rotational direction opposite of the first rotational direction and causes one end of the pedal lever to engage the raise detent protruding from the outer cylindrical surface of the tubular collar. When the pedal lever engages the raised detent and prevents rotation, the supplemental feeder is in the ON position allowing feed to flow. When the pedal lever is released, the tubular collar rotates back to the default biased to an "off", or non-dispensing" position. For one implementation of the pedal lever, a hinge torsion spring is not used, but instead, the pedal lever pivotally rotates to a default engagement position to engage the raised detent. For this implementation, the end of the pedal lever opposite the pedal end is substantially heavier than the pedal end of the pedal lever, to thereby urge the pedal lever to rotate to the engagement position.

For another implementation, a tension spring is connected between the tubular collar and the annular collar clamps, where said tension spring has a first hook attached to a tubular collar mount and a distal hook attached to a clamp mount, where the tension spring urges rotation of the tubular collar in a first rotational direction about the axis of the tubular collar. For one implementation an extension tube has an interior hollow extension channel, where said extension tube extends perpendicularly from the tubular collar and where the interior hollow extension channel and the interior hollow collar channel communicate.

A pedal lever is pivotally attached to pivot about the torsion spring loaded hinge, where the hinge torsion spring has a tension pin contacting the pedal lever and urges rotation of the pedal lever in a second rotational direction opposite of the first rotational direction and causes one end of the pedal lever to engage the raised detent protruding from the outer cylindrical surface of the tubular collar. In another implementation of the technology, a tension spring is used to urge the pedal lever in the second rotational direction about the pivot. The tension spring would be placed on the opposing side of the spring loaded hinge, opposite the position of the torsion spring.

One implementation of an apparatus and method is described herein for a control supplemental spring loaded feeder system that provides a spring loaded control supplemental feeder that is attached in a manner to control one or more distally space apart follower supplemental feeders to dispense feed. One implementation of the control supplemental feeder attached in a manner to control follower supplemental feeders, which includes a bracket clamp that protrudes from the outer cylindrical surface of the tubular collar. One of a cable or a rod is attached to the bracket clamp and extends to attach to one or more distally spaced apart tubular collars each having axially aligned interior hollow channels and each having a corresponding extension tube and corresponding interior hollow channel extending perpendicular to the one or more distally space apart tubular collars.

The details of the technology as disclosed and various implementations can be better understood by referring to the figures of the drawing. Referring to FIG. 1, an illustration of a spring loaded supplemental feeder in the dispense position is shown. A supplemental feeder apparatus 100 is illustrated. A pair of left 108 and right 106 annular collar clamps is illustrated. The left and right annular collar clamps are spaced apart providing a gap there between and where the left annular collar clamp 108 has a right side annular recess 109 adjacent the gap and the right annular collar clamp 106 has a left side annular recess 107 adjacent the gap.

A tubular collar 110 is illustrated. The tubular collar channel 110 has an interior hollow collar channel, not shown in FIG. 1, and said tubular collar extends across the gap between the left 108 and right 106 annular collar clamps. The annular collar clamps 108 and 106 are configured to mount as a clamp over the feed tube 102. The tubular collar 110 has a left detent 111 extending from a left end of the tubular collar 110 into the left side annular recess 109 of the left annular collar and has a right detent extending from a right side of the tubular collar into the left side annular recess of the right annular collar (not shown in this figure), and where said tubular collar has a raised detent 122 protruding from the outer cylindrical surface of the tubular collar 110. This raised detent 122 is shown engaging the pedal lever 114 having a pedal 116. The pedal lever 114 is pivotally attached to pivot as indicated by rotational arrow 118 about a torsion spring loaded hinge (not shown in this figure). The end 115 of the pedal lever 114 engages the raised detent 122.

A torsion spring (not shown in this figure) is coaxial with respect to the tubular collar 110, where said torsion spring has a tension rod (not shown in this figure) extending from the torsion spring to engage the left detent 111. The torsion spring urges rotation of the tubular collar in a first rotational direction about the axis of the tubular collar. An extension tube 112 is illustrated. The extension tube has an interior hollow extension channel (not shown in this figure), where said extension tube 112 extends perpendicularly from the tubular collar 110 and where the interior hollow extension channel and the interior hollow collar channel communicate to allow feed to flow between channels.

Figure 7:
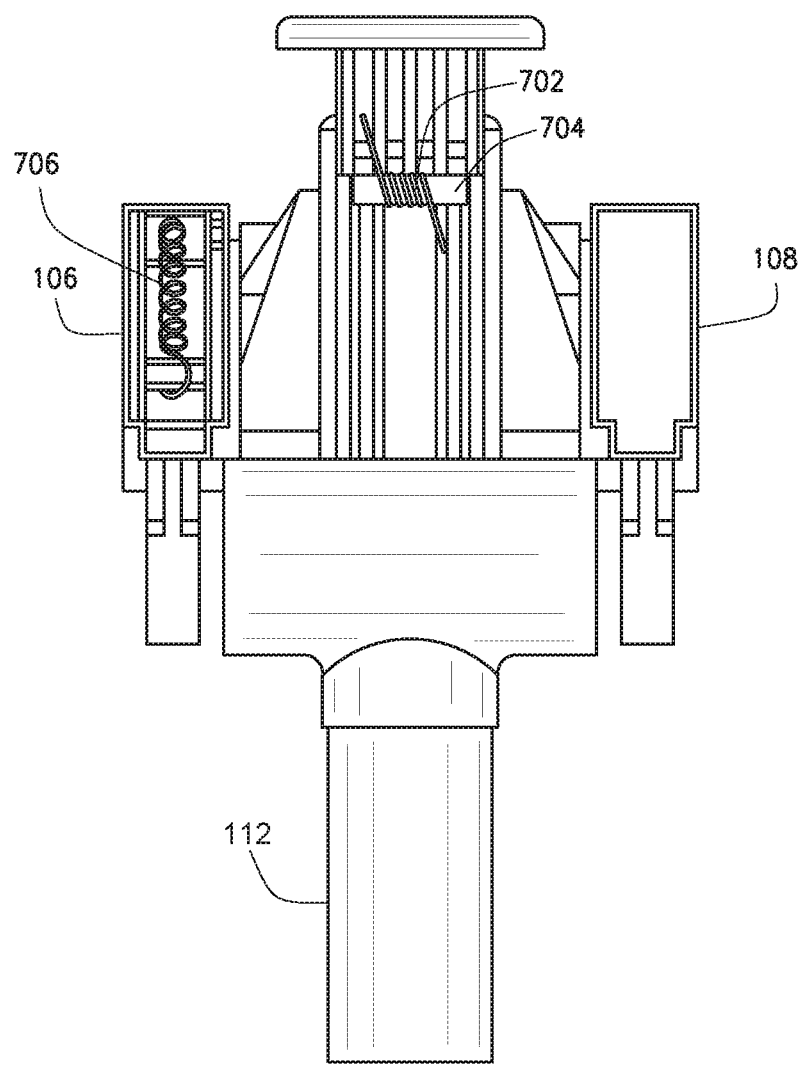
FIG. 7 is an illustration of the control supplemental feeder showing the pedal lever, hinge and torsion spring.

A torsion spring loaded hinge (not shown in this view—SEE FIG. 7) extends between and is fixed between the left and right annular collar clamps and has a hinge torsion spring (not shown in this view—SEE FIG. 7). A pedal lever 114 is pivotally attached to pivot about the torsion spring loaded hinge (not shown in this view), where the hinge torsion spring has a tension pin contacting the pedal lever and urging rotation of the pedal lever in a second rotation direction opposite of the first rotational direction and causing one end of the pedal lever to engage the raise detent 122 protruding from the outer cylindrical surface of the tubular collar 110. When the pedal lever engages the raised and prevents rotation, the supplemental feeder is in the ON position allowing feed to flow. When the pedal lever is released, the tubular collar rotate back to the default biased to an "off", or non-dispensing" position. For one implementation of the pedal lever, a hinge torsion spring is not used, but instead, the pedal lever pivotally rotates to a default engagement position to engage the raised detent. For this implementation, the end of the pedal lever end opposite the pedal end is substantially heavier than the pedal end of the pedal lever, to thereby urge the pedal lever to rotate due to gravity to the engagement position See FIGS. 10 through 14.

For one implementation, a plurality of spring loaded feeders are mounted on a feed line and space apart along the feed line. The plurality of spring loaded feeders can be rotated to the feed position and released with the pedal level to return to the stowed position thereby shutting off the flow of feed. For one implementation of the supplemental feeding apparatus, a bracket clamp 120 protrudes from the outer cylindrical surface of the tubular collar 110. As described, the present supplemental spring loaded feeder design can be used at every location along the feed line. However, another implementation is to utilize the spring loaded supplemental feeder as a control to switch multiple spaced apart follower supplemental feeder assemblies. For one implementation, a cable, a rod or other member is attached to the bracket clamp 120 and extends from the bracket clamp, substantially parallel to the nourishment line to attach to one or more distally spaced apart tubular collars of supplemental feeders each having axially aligned interior hollow channels and each having a corresponding extension tube and corresponding interior hollow channel extending perpendicular to the one or more distally space apart tubular collars. The cable or rod provides sufficient tension between the control supplemental spring loaded feeder and the follower supplemental feeders and the rod has sufficient tensile and shear strength to urge the follower supplemental feeders to rotate with the control supplemental spring loaded feeder. In an alternate embodiment a long cable or rod connects at the distal end of the feed line to a spring, and at the proximal end of the line it is threaded and runs through a crank pulling laterally along the line of action of the feeding tube, pulling from back to front. This lateral action engages a modified trigger arm on multiple spring loaded feeders at one time. The aforementioned crank can be manual or machine driven and could be set up to be engaged remotely to minimize humans presence inside the barns.

Figure 2:
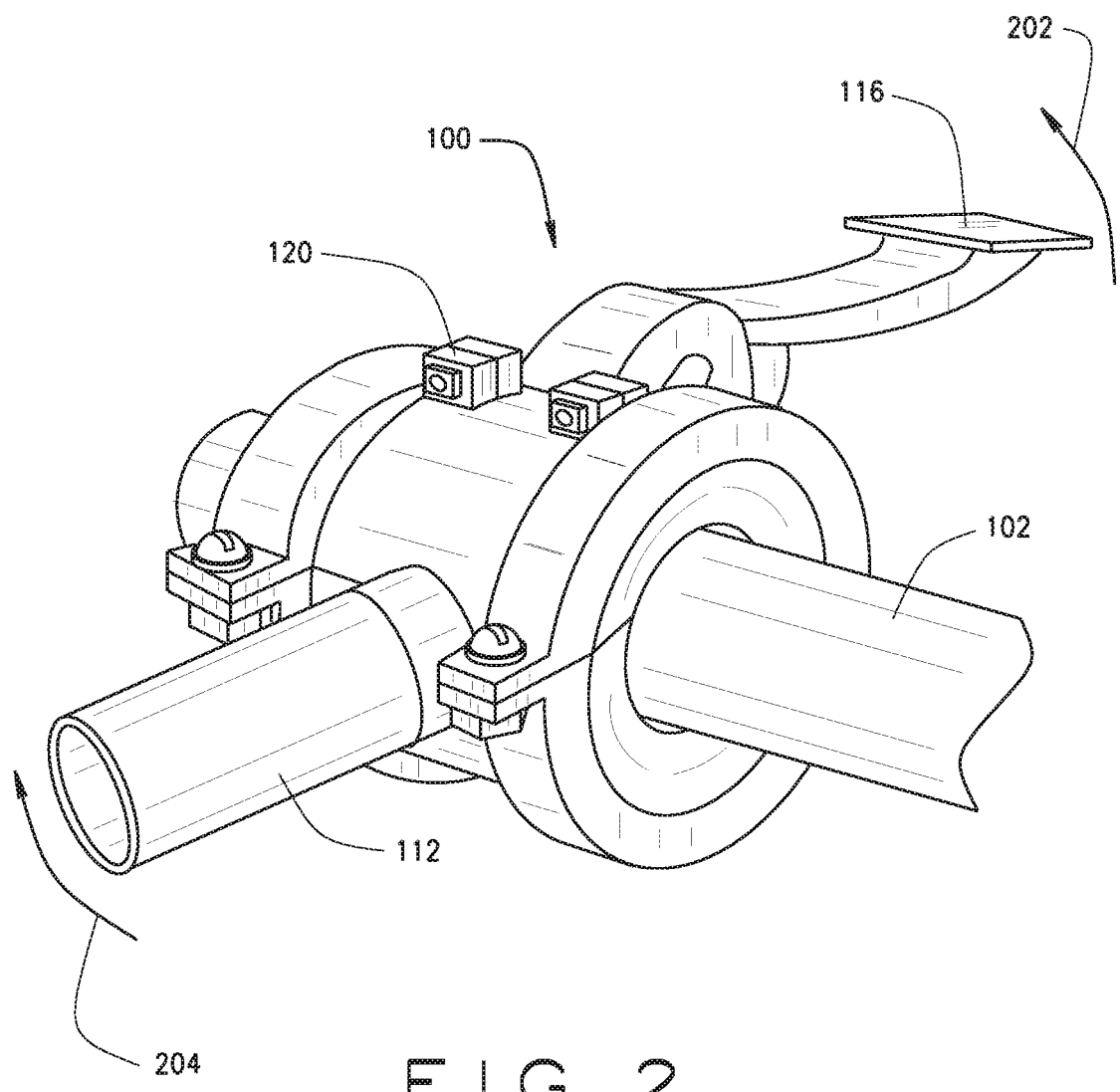
FIG. 2 is an illustration of a control supplemental feeder in the off position.

Referring to FIG. 2, an illustration of a spring loaded supplemental feeder in the off position is provided. For one implementation, the pedal lever is torsion spring loaded such that the pedal lever is urged to rotate in the direction indicated by arrow 202. The pedal lever pedal 116 can be depressed to cause the pedal lever to rotate in the direction opposite arrow 202. The end of the lever proximate the raised detent disengages the raised detent 122 and the collar 110 is urged to rotate as indicated by arrow 204 to a stowed position thereby stopping the flow of feed. For one implementation of the pedal lever, a hinge torsion spring is not used, but instead, the pedal lever pivotally rotates to a default engagement position to engage the raised detent. For this implementation, the end of the pedal lever end opposite the pedal end is substantially heavier than the pedal end of the pedal lever, to thereby urge the pedal lever to rotate due to gravity to the engagement position—SEE FIGS. 10-14.

The extension tube 112 will be oriented horizontally so that feed will not flow there through. For one implementation the spring loaded supplemental feeder is utilized as a spring loaded control supplemental feeder, whereby the spring loaded control supplemental feeder includes a cable, rod or other like member is attached between the bracket 120 and other spaced apart supplemental feeders. As is seen between FIGS. 1 and 2, the brackets 120 have rotated 90 degrees. Therefore, similarly, the brackets of the one or more spaced apart supplemental feeders will follow the rod rotation and be rotated 90 degrees.

Figure 3:
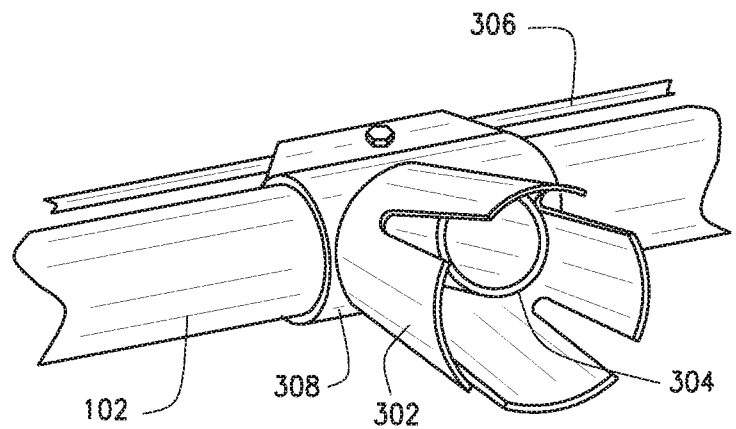
FIG. 3 is an illustration of a spaced apart supplemental feeder.

Referring to FIG. 3, an illustration of a spaced apart follower supplemental feeder is shown. The spaced apart supplemental feeder includes a collar portion 308 that is co-axial with respect to the feed line 102. The collar portion can pivot and rotate about the feed line similar to that of the control supplemental feeder 100. An extension tube extends perpendicularly from the collar portion 308 and has a channel that is communicable with the channel of the spaced apart supplemental feeder. A hood 302 extends over the extension tube 304 to further channel the feed to control the direction of flow as the flow of feed exits the extension tube. A cable 306 or rod or other member is attached to a bracket that is attached to the outer cylindrical surface of the side wall of the spaced apart supplemental feeder, and the cable 306 extends to the bracket 120 of the control supplemental feeder. Therefore, the cable will cause the spaced apart supplemental feeder to follow the rotation of the spring loaded control supplemental feeder. FIGS. 3, 4, 5 and 6 illustrate a supplemental feeder system having a main spring loaded control supplemental feeder attached by a cable or rod to one or more follower supplemental feeders. As mentioned previously, one implementation includes a spring loaded supplemental feeder for each supplemental feeder location without any attached follower supplemental feeders.

Figure 4:
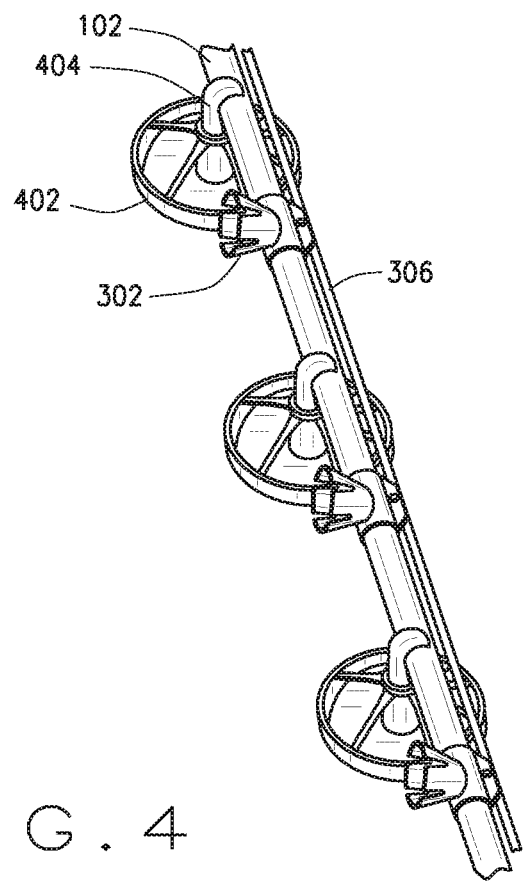
FIG. 4 is an illustration of multiple spaced apart supplemental feeders along with the main feeding troughs.

Referring to FIG. 4, an illustration of multiple spaced apart supplemental feeders along with the main feeding troughs is shown. A cable 306 or rod or other member is attached between each of the spaced apart supplemental feeders and the cable 306 will extend to the bracket 120 of the control supplemental feeder. FIG. 4 also illustrates the standard feeding troughs 402 that are communicably connected to the feed line 102 by a conduit 404 and are used to feed more mature birds.

Figure 5:
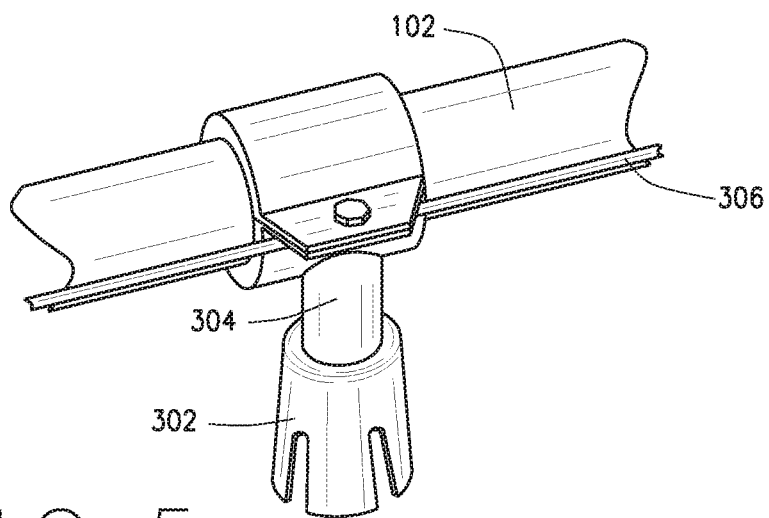
FIG. 5 is an illustration of a spaced apart supplemental feeder in the dispense position.

Referring to FIG. 5, an illustration of a spaced apart supplemental feeder is shown in the dispense position where the extension tube 304 and hood 302 are oriented vertically in the engage position such that feed can freely flow from the feed line, into the supplemental feeder and through the extension tube. The cable 306 is also illustrated in this view. For one implementation, the supplemental feeders illustrated in FIGS. 3, 4, 5 and 6 are retrofitted with the cover bracket 902 illustrated in FIG. 9, which provides a detent 904, a mounting eyelet 980, and member 906 for attaching a tension spring, in order to convert the supplemental feeder to a spring loaded supplemental feeder.

Figure 6:
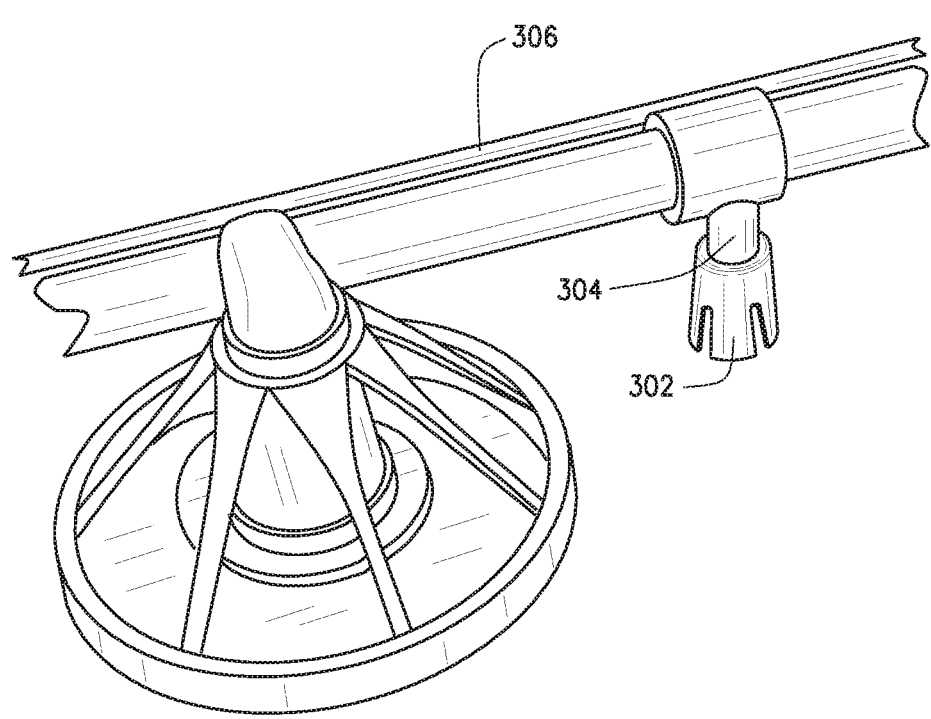
FIG. 6 is an illustration of a spaced apart supplemental feeder along with a main feeding trough.

Referring to FIG. 6, an illustration of a spaced apart supplemental feeder along with a main feeding trough is shown for further illustration. Referring to FIG. 7, an illustration of the control supplemental feeder showing the pedal lever and hinge 704 is shown. The hinge 704 is shown attached between the collar clamps 106 and 108. A torsion spring loaded hinge extends between and is fixed between the left and right annular collar clamps and has a hinge torsion spring 704. The hinge rod 704 is mounted to a support bracket that is fixed between the left and right annular collars. A pedal lever 114 is pivotally attached to pivot about the torsion spring loaded hinge 704, where the hinge torsion spring 702 has a tension pin extending from an end of the tension spring and contacting the pedal lever and urging rotation of the pedal lever in a second rotation direction opposite of the first rotational direction and causing one end of the pedal lever to engage the raised detent 122 protruding from the outer cylindrical surface of the tubular collar 110.

Referring to FIG. 7, an illustration of the control supplemental feeder showing the pedal lever, hinge 704 and tension spring 706 is shown. The spring loaded supplemental feeder is shown in FIG. 7. The pedal lever 114, pivots about the hinge rod 704. A torsion spring 702 is coaxially over the hinge rod 704 and the torsion spring urges the pedal lever to rotate up to engage the detent. This view also provides a cut-away that reveals a tension spring 706 that urges the tubular collar in a first rotational direction opposite the second rotational direction of the torsion spring 702. For one implementation of the pedal lever, a hinge torsion spring is not used, but instead, the pedal lever pivotally rotates to a default engagement position to engage the raised detent. For this implementation, the end of the pedal lever end opposite the pedal end is substantially heavier than the pedal end of the pedal lever, to thereby urge the pedal lever to rotate due to gravity to the engagement position—SEE FIGS. 10-14.

Figure 8:
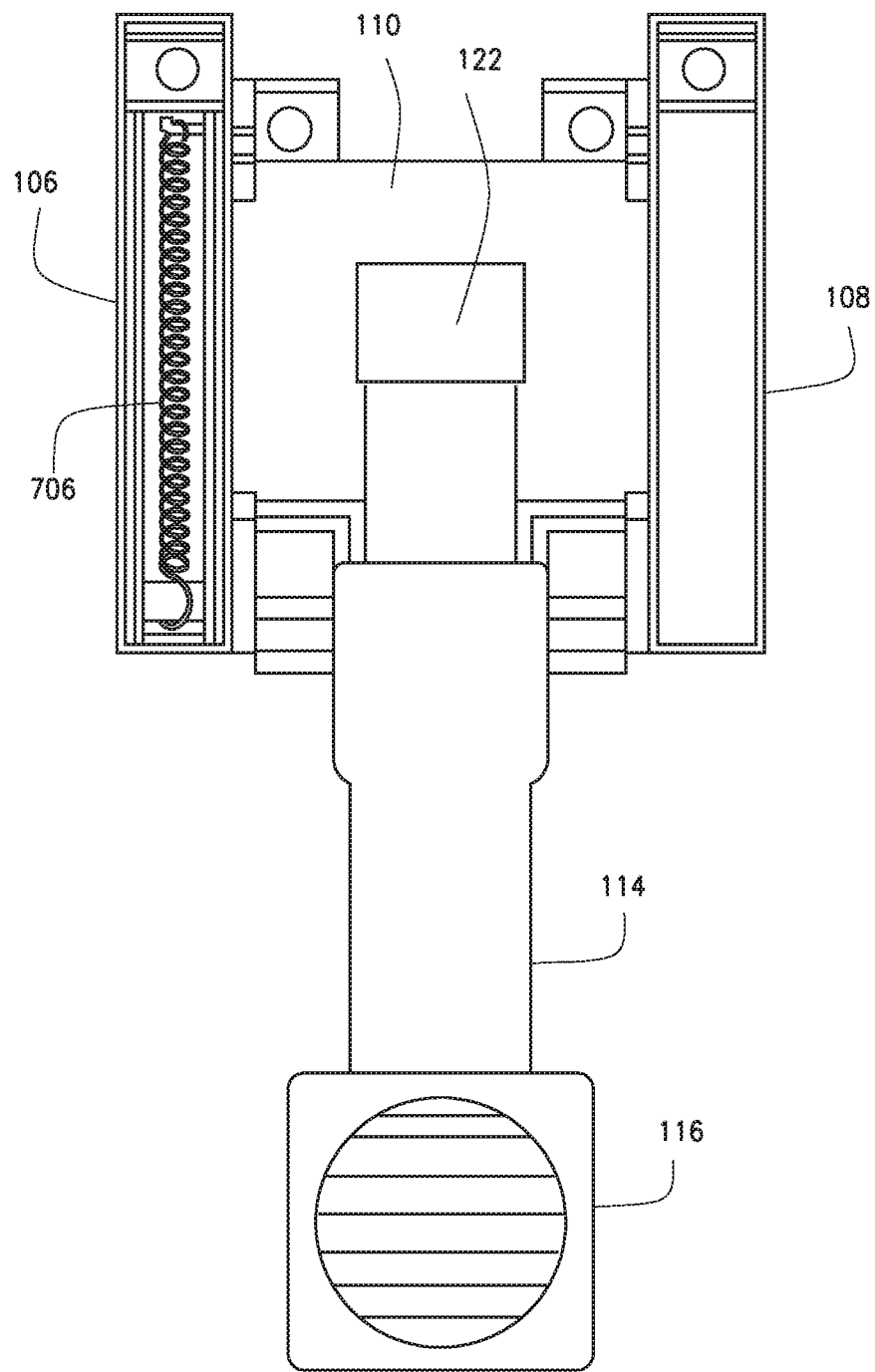
FIG. 8 is a sectional view illustrating the tension spring interface with the tubular collar and the pedal lever.

Referring to FIG. 8, a cut-away view illustrating the tension springs interface with the tubular collar and the collar clamps and the pedal lever. Part of the external shell of the annular collar clamp 106 is shown with a cut-away to reveal the tension spring 706. The tension spring 706 is hooked to a member attached to the annular collar clamp and the opposing end of the tension spring is hooked to a member protruding from one end of the tubular collar 110. For one implementation of the device, the opposite annular collar 108 is similarly configured with a tension spring that is hooked to a member attached to the collar clamp and the opposing end of the tension spring is hooked to a member protruding from one end of the tubular collar.

Figure 9:
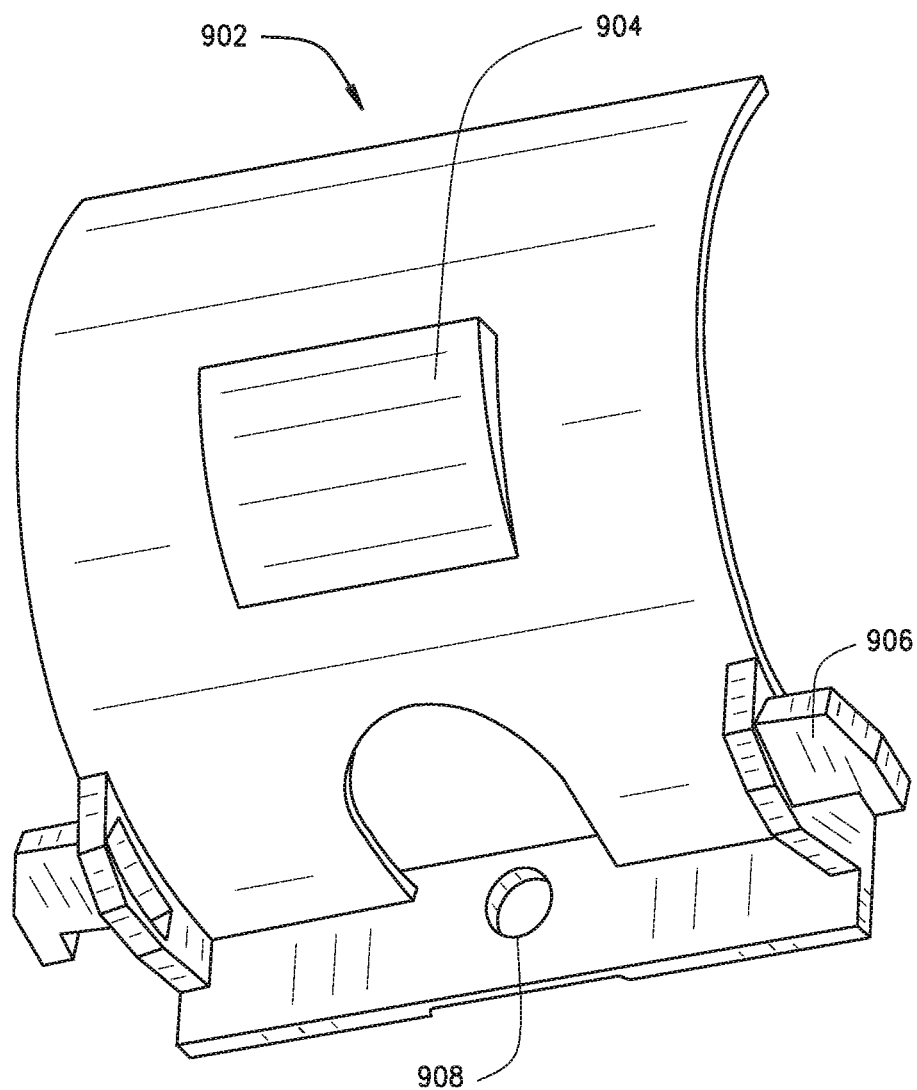
FIG. 9 is an illustration of a retrofit bracket.

Referring to FIG. 9, an illustration of a retrofit bracket is provided. This bracket is used to mount over existing feeder systems to convert to the new design. The retrofit bracket 902 provides the raised detent 904 for engaging the pedal lever and the member 906 for attaching one end of the tension spring. The retrofit bracket also includes a mounting hole 908.

Figure 10:
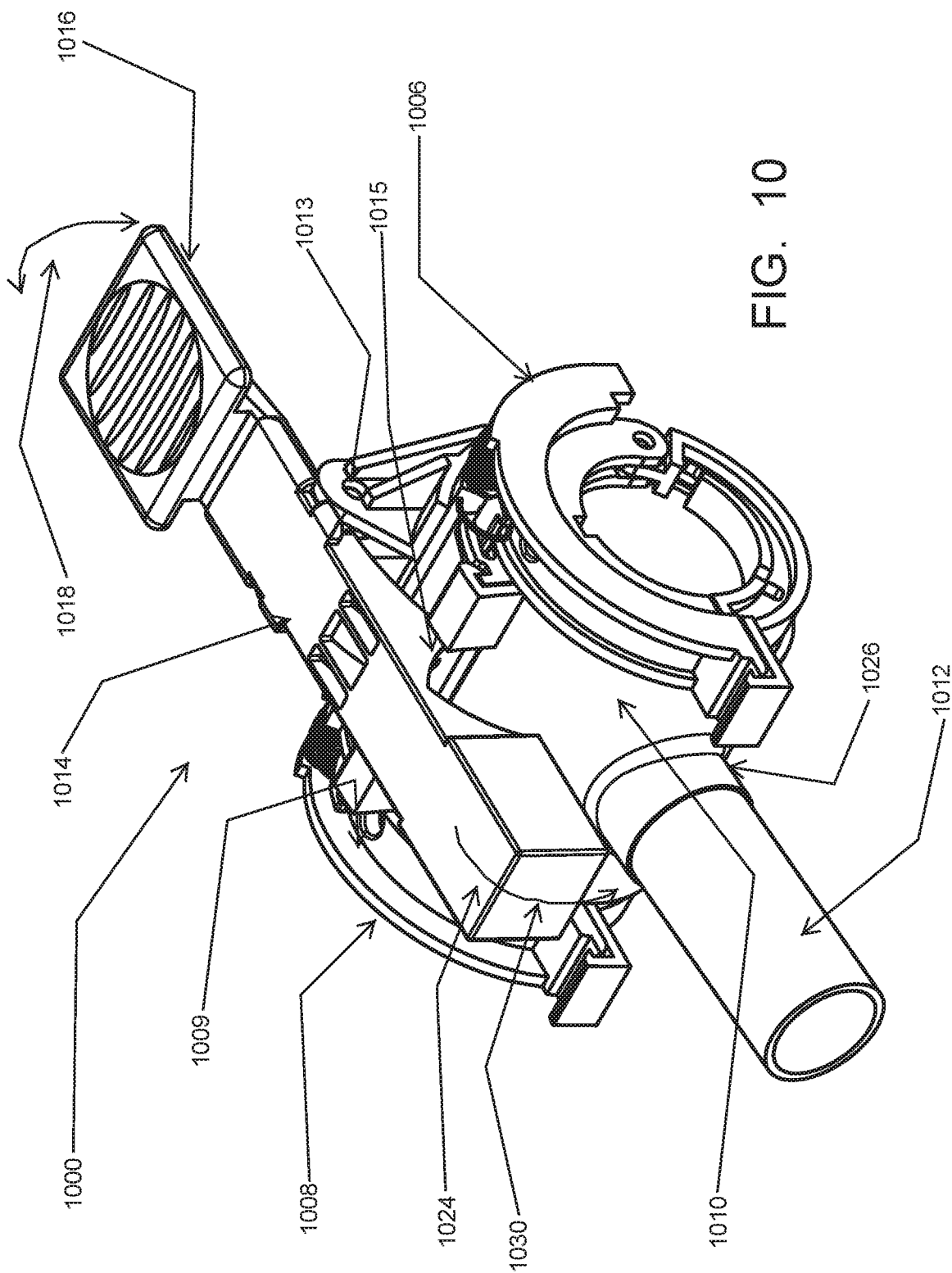
FIG. 10 is an illustration of a control supplemental feeder in the OFF position.

FIG. 10 is an illustration of another implementation of a control supplemental feeder in the OFF position. A control supplemental feeder apparatus 1000 is illustrated. A pair of left 1008 and right 1006 circle segment collar clamps is illustrated. The left and right circular segment collar clamps are spaced apart providing a gap there between and where the left circle segment collar clamp 1008 has a right side annular recess 1009 adjacent the gap and the right annular collar clamp 1006 has a left side annular recess adjacent the gap (Not Shown).

A tubular collar 1010 is illustrated. The tubular collar channel 1010 has an interior hollow collar channel, not shown in FIG. 10, and said tubular collar extends across the gap between the left 1008 and right 1006 circle segment collar clamps. The circle segment collar clamps 1008 and 1006 are configured to mount as a clamp over a feed tube. The tubular collar 1010 has a raised detent 1122 protruding from the outer cylindrical surface of the tubular collar 1010. This raised detent 1122 is shown engaging the pedal lever 1014 having a pedal 1016. The pedal lever 1014 is pivotally attached to pivot as indicated by rotational arrow 1018 about a torsion spring loaded hinge (not shown in this figure). For one implementation of the pedal lever, a hinge torsion spring is not used, but instead, the pedal lever pivotally rotates to a default engagement position to engage the raised detent. For this implementation, the end 1024 of the pedal lever opposite the pedal end 1016 is substantially heavier than the pedal end 1016 of the pedal lever, to thereby urge the pedal lever to rotate to the engagement position.

An extension tube 1012 is illustrated. The extension tube has an interior hollow extension channel (not shown in this figure), where said extension tube 1012 extends perpendicularly from the tubular collar 1010 and where the interior hollow extension channel and the interior hollow collar channel communicate to allow feed to flow between channels. For one implementation of the technology, the tubular collar has an opening in the general area indicated by item 1026 in its side wall, which is aligned with a hole in the feed line when the tubular collar is rotated to the ON position. The hole in the feed line is positioned on the bottom/underside of the feed line in order to direct flowing feed vertically downward toward a poultry house floor. When the tubular collar rotates to the ON position, the opening in the wall of the tubular collar aligns with the hole on the underside of the feed line. Feed will flow and gravity feed through the hole and opening. When the tubular collar rotates to the OFF position, the opening in the wall of the tubular collar does not align with the hole on the underside of the feed line, but instead the opening rotates to a side position on the feed line thereby closing of the flow of feed. Feed will cease to flow through the hole and opening. For one implementation, an extension tube 1012 having an interior channel with an entry opening and an exit opening is connected to the tubular collar 1010 such that the entry opening of the extension tube is communicably attached to the opening in the sidewall of the tubular channel such that feed can gravity feed through the hole in the feed line, through the opening of the tubular collar and through the extension tube. The extension tube 1012 provides better channeling of the feed flow to the desired and more focused location of the floor of the poultry house rather than having the feed spread more randomly as it flow through and exits the hole of the feed line and the opening of the tubular collar.

A pedal lever 1014 is pivotally attached to pivot about the hinge 1013, where the pedal lever 1014 is heavier on the end 1024 opposite the pedal 1016 thereby urging rotation of the pedal lever in a second rotation direction opposite of the first rotational direction and causing a locking member 1015 extending from the pedal lever 1014 to engage the raise detent 1122 protruding from the outer cylindrical surface of the tubular collar 1010. When the pedal lever engages the raised detent 1122 and prevents rotation, the supplemental feeder is in the ON position allowing feed to flow. When the pedal lever is released, the tubular collar rotate back to the default biased to an "OFF", or "non-dispensing" position. For one implementation of the pedal lever, a hinge torsion spring is not used, but instead, the pedal lever pivotally rotates to a default engagement position to engage the raised detent because a weight bias on one end. For this implementation, the end 1024 of the pedal lever opposite the pedal end 1016 is substantially heavier than the pedal end 1016 of the pedal lever 1014, to thereby urge the pedal lever to rotate due to gravity to the engagement position—See FIGS. 10 through 14 for further illustration of the ON and OFF positions.

For the one implementation of the control supplemental feeder as illustrated in FIGS. 10-14, a plurality of supplemental feeders are mounted on a feed line and spaced apart along the feed line. The plurality of supplemental feeders can be rotated to the feed position and released with the pedal lever to return to the stowed position thereby shutting off the flow of feed from the supplemental feeders. For one implementation of the supplemental feeding apparatus, a bracket clamp protrudes from the outer cylindrical surface of the tubular collar 1010. As described, the present control supplemental spring loaded feeder design can be used at every location along the feed line. However, another implementation is to utilize the spring loaded control supplemental feeder 1000 as a control to switch multiple spaced apart follower supplemental feeder assemblies. See FIGS. 2, 3 and 4 and the related description for further illustration of this methodology. For one implementation, a cable, a rod or other member is attached to the bracket clamp and extends from the bracket clamp, substantially parallel to the nourishment line to attach to one or more distally spaced apart tubular collars of supplemental feeders each having axially aligned interior hollow channels and each having a corresponding extension tube and corresponding interior hollow channel extending perpendicular to the one or more distally space apart tubular collars.

The cable or rod provides sufficient tension between the control supplemental spring loaded feeder and the follower supplemental feeders and the rod has sufficient tensile and shear strength to urge the follower supplemental feeders to rotate with the control supplemental spring loaded feeder. In an alternate embodiment a long cable or rod connects at the distal end of the feed line to a spring, and at the proximal end of the line it is threaded and runs through a crank pulling laterally along the line of action of the feeding tube, pulling from back to front. This lateral action engages a modified trigger arm on multiple spring loaded feeders at one time. The aforementioned crank can be manual or machine driven and could be set up to be engaged remotely to minimize humans presence inside the barns.

Figure 11:
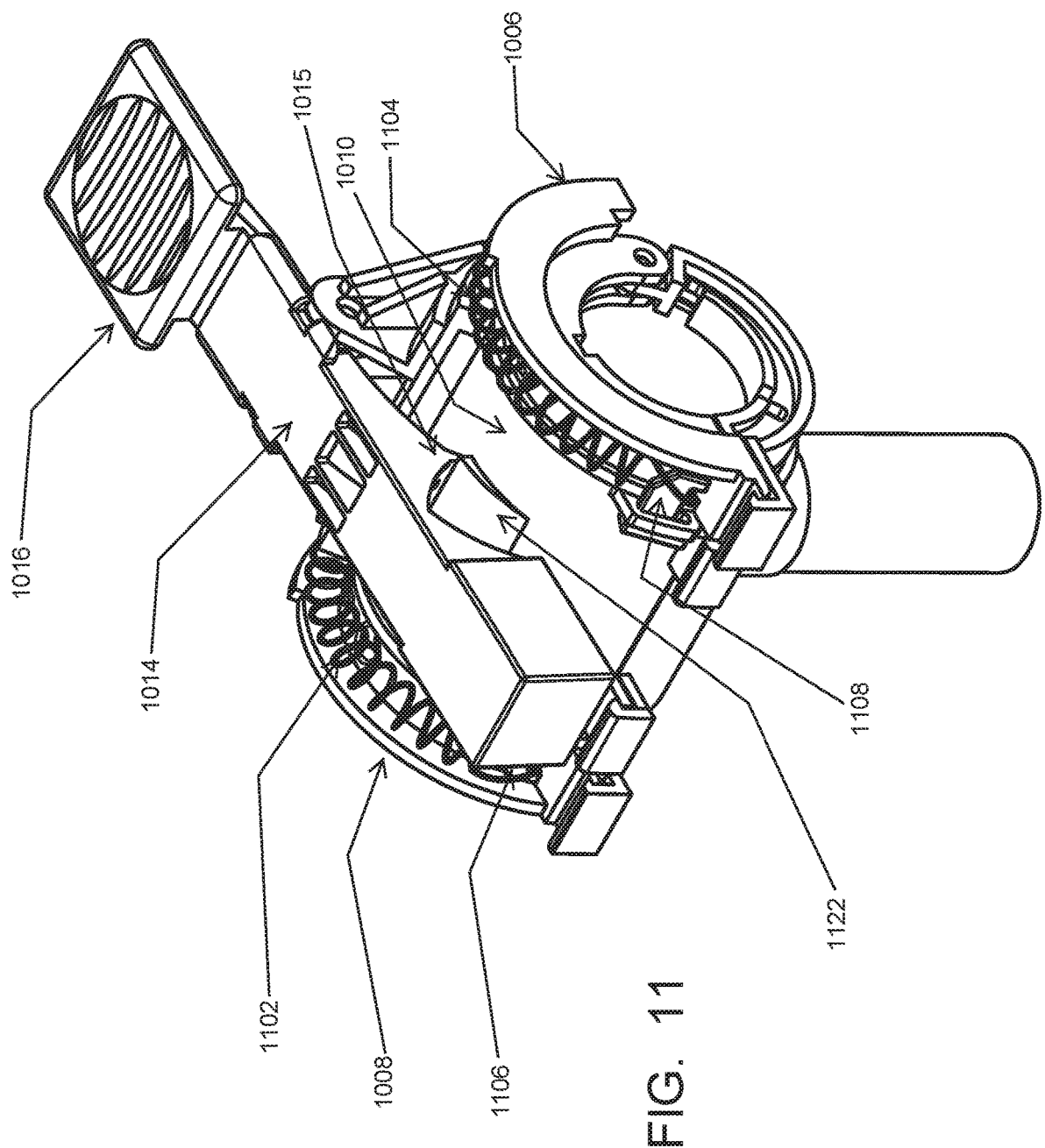
FIG. 11 is an illustration of the tension springs in the left and right recesses of the left and right circular segment collars where the springs are shown under tension when the supplemental feeder is in the ON position.

Referring to FIG. 11, an illustration of the tension springs in the left and right recesses of the left and right circular segment collars is shown where the springs are shown under tension when the supplemental feeder is in the ON position. FIG. 11 illustrates the left and right circle segment clamps with a portion a cut-away to provide a view illustrating the tension springs interface with the tubular collar and the collar clamps and the pedal lever. Part of the external shell of the circle segment collar clamp 1006 is shown with a cut-away to reveal the tension springs 1102 and 1104. The tension springs are hooked to members 1106 and 1108, as shown, which are attached to one end of the tubular collar 1010 and the opposing end of the tension spring is hooked to members 1302 and 1304 protruding from the circle segment collar clamps. For one implementation of the device, the annular collars 1008 and 1006 are similarly configured with a tension spring that is hooked to a member attached to the collar clamp and the opposing end of the tension spring is hooked to a member protruding from one end of the tubular collar. For one implementation one tension spring is used on one side with one annular collar. For yet another implementation, a torsion spring is utilized.

Figure 12:
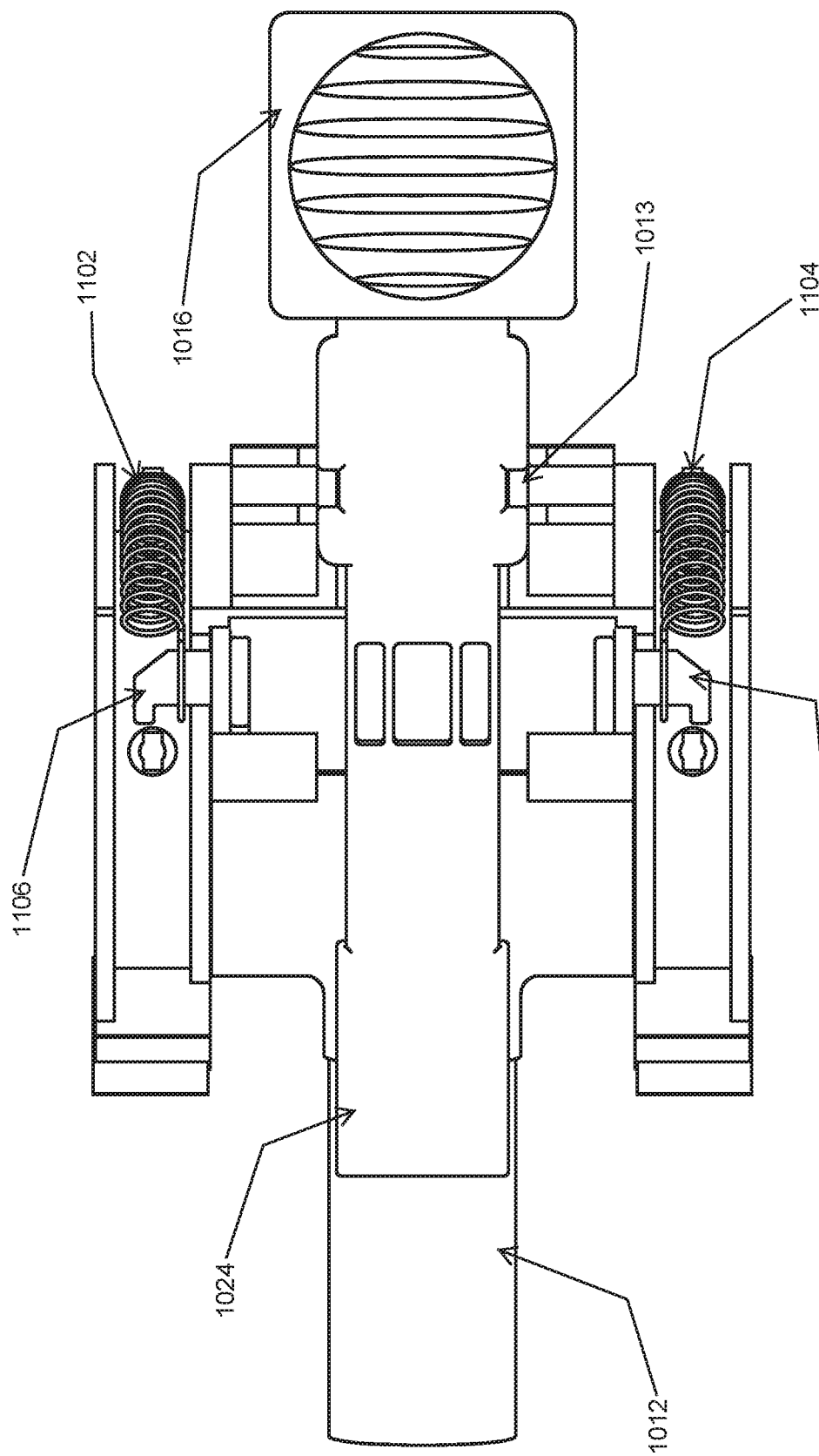
FIG. 12 is an illustration of the tension springs in the left and right recesses of the left and right circular segment collars where the springs are shown in the default position when the supplemental feeder is in the OFF position.

FIG. 12 is an illustration of the tension springs in the left and right recesses of the left and right circular segment collars where the springs are shown in the default position when the supplemental feeder is in the OFF position. This view also provides a cut-away that reveals tension springs 1102 and 1104 that urges the tubular collar in a first rotational direction opposite the second rotational direction of the pedal lever.

For one implementation of the pedal lever, a hinge torsion spring is not used, but instead, the pedal lever pivotally rotates to a default engagement position to engage the raised detent. For this implementation, the end of the pedal lever end opposite the pedal end is substantially heavier than the pedal end of the pedal lever, to thereby urge the pedal lever to rotate due to gravity to the engagement position—SEE FIGS. 10-14.

Figure 13:
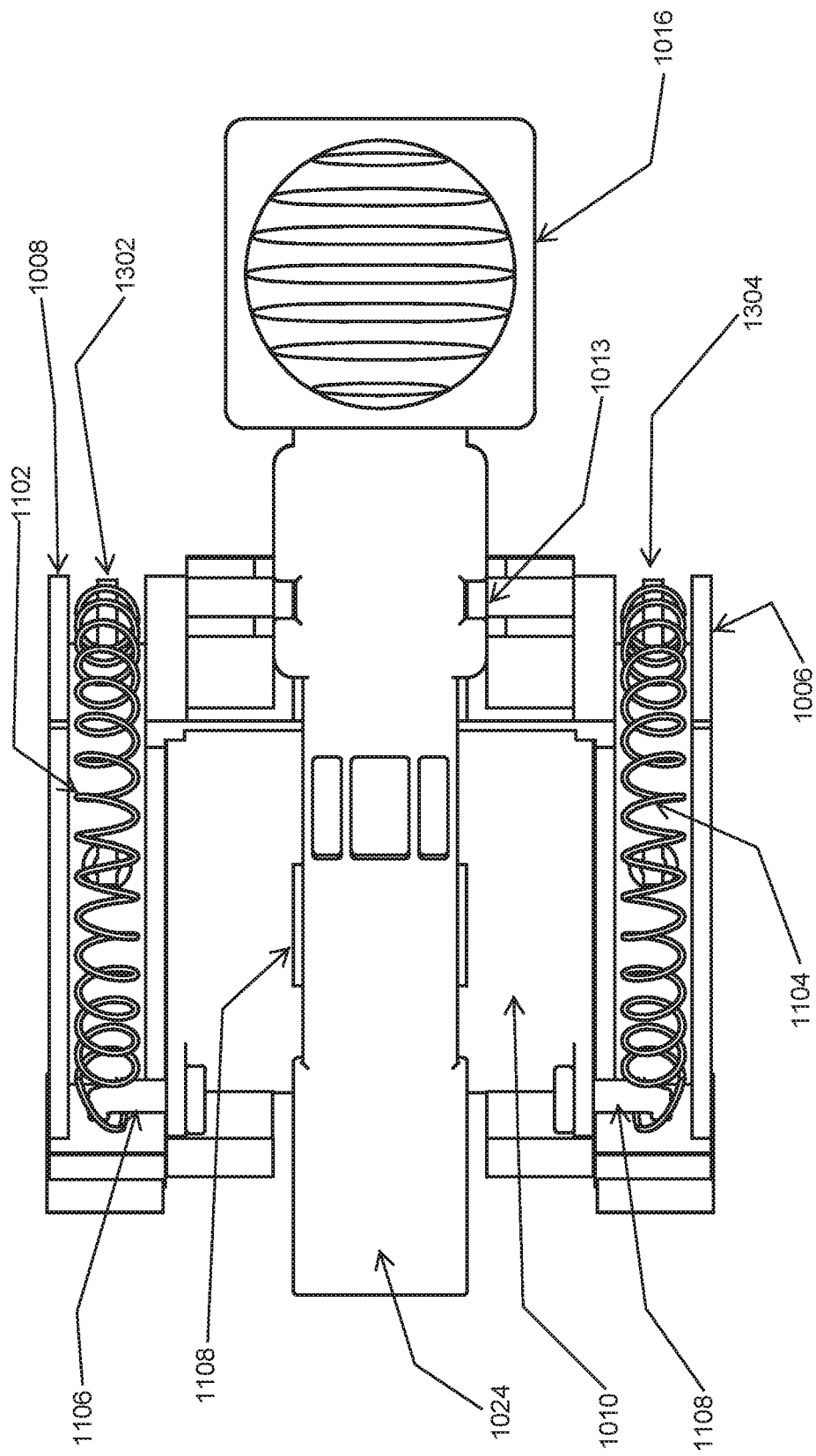
FIG. 13 is an illustration of a control supplemental feeder in the ON position.
Figure 14:
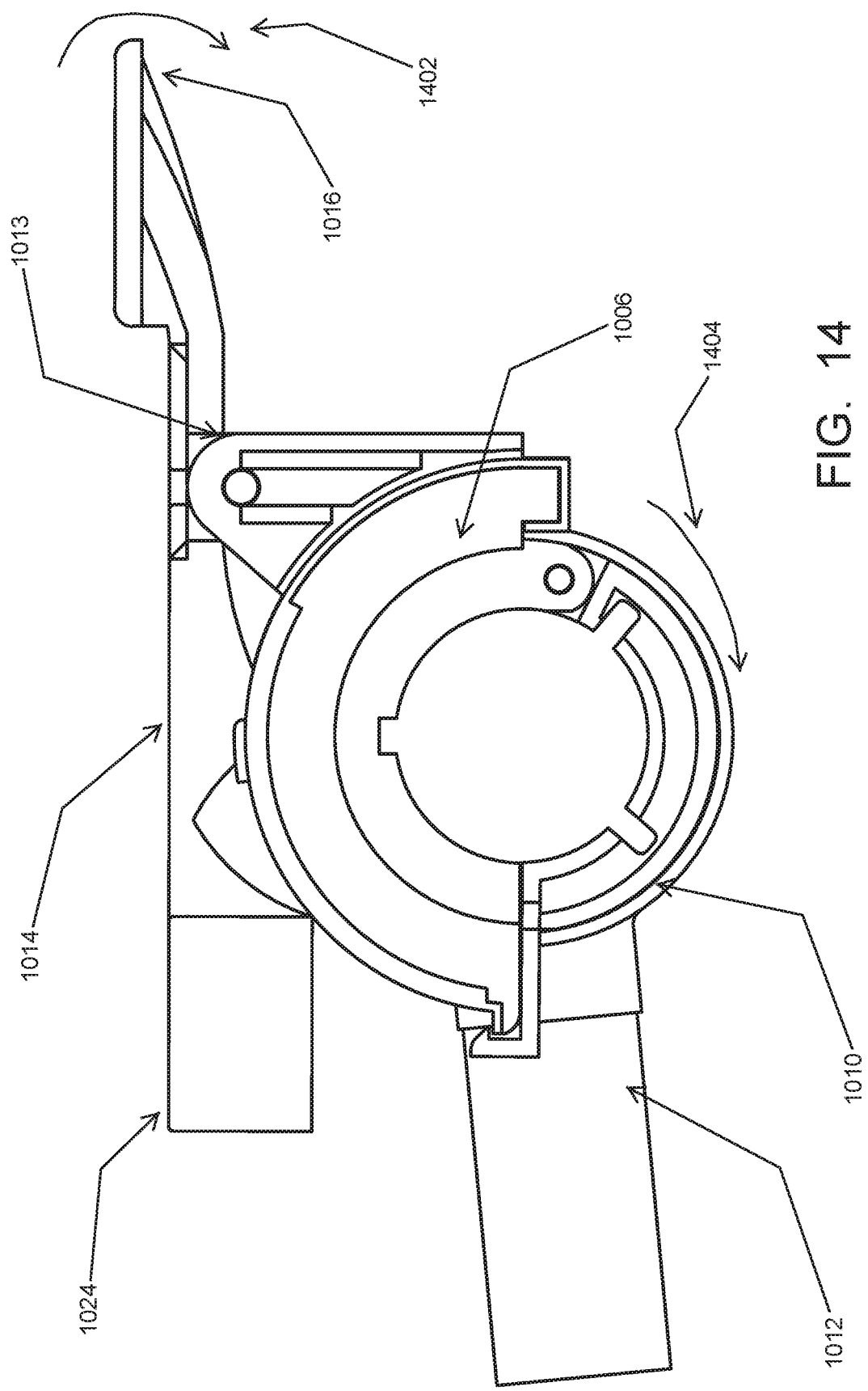
FIG. 14 is an illustration of a control supplemental feeder in the OFF position.

Referring to FIG. 13, an illustration of a control supplemental feeder in the ON position is shown. The extension tube 1012 cannot be seen in this view because it is in the ON position. In this view, the weightier end 1024 of the pedal lever has urged the pedal lever to rotate about the hinge 1013 such that the pedal lever engages the raised detent 1108. The tension springs 1102 are extended and the tubular collar's rotation is stopped as the pedal lever engages the raised detent. Referring to FIG. 14, an illustration of a control supplemental feeder in the OFF position is shown. In this view, the pedal 1016 has been depressed to rotate the pedal lever in the rotational direction indicated by 1402. Depression of the pedal 1016 and rotation 1402 of the pedal lever, disengages the pedal lever from the raised detent, thereby freeing up and allowing the tension springs to retract and urge rotation 1404 of the tubular collar 1010, which thereby repositions the attached tubular extension 1012 to the stowed "OFF" position where flow of feed through the extension tube is ceased.

In one implementation, the main control supplemental feed assembly is remotely actuated rather than by a manual pedal. The same functionality would apply, however, rather than using a manual pedal, a motor assembly is attached to the collar 1010 in a manner to drive rotation of the collar and thereby the extension tube from a substantially horizontal stowed position (no feed flow position) to a substantially vertical feed flow dispense position. For example a two way stepper motor could be used to drive the collar of the main control supplemental feed assembly. A second motor is used to drive the pivoting rotation of the pedal lever. These motors are controlled remotely either through a wired or wireless interface.

The various supplemental feeder examples shown above illustrate a more efficient supplemental feeder system. A user of the present technology as disclosed may choose any of the above implementations, or an equivalent thereof, depending upon the desired application. In this regard, it is recognized that various forms of the subject supplemental feeder could be utilized without departing from the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A control supplemental feeder apparatus comprising:
   a pair of left and right collar clamps spaced apart providing a gap there between;
   a tubular collar coaxial with respect to the left and right collar clamps and rotationally attached to the left and right collar clamps to rotate about a coaxis and a spring attached between the tubular collar and one of the left and right collars, where said tubular collar is spring loaded by the spring in a first rotation direction; and
   an opening in a wall of the tubular collar extending through to an interior channel of the tubular collar.

2. The control supplemental feeder apparatus recited in claim 1, comprising:
   an extension tube having an interior extension channel communicably attached to the interior channel of the tubular collar.

3. The control supplemental feeder apparatus recited in claim 2, where the spring is a tension spring and where said first rotation direction is rotation to a position where said extension tube rotates to a substantially horizontal orientation.

4. The control supplemental feeder apparatus recited in claim 2, where the spring is a torsion spring coaxial with respect to the tubular collar, where said torsion spring has a tension rod extending from the torsion spring to engage the tubular collar and urges rotation of the tubular collar in a first rotational direction about the axis of the tubular collar.

5. The control supplemental feeder apparatus recited in claim 2, comprising:
   a detent on an outer cylindrical surface of the tubular collar; and
   a pedal lever pivotally attached to pivot about a hinge, where said hinge is attached between the left and right annular collar clamps where the pedal lever is configured for urging rotation in a second direction about an axis of said hinge that is parallel to the co-axis for engaging the detent with a locking member extending from the pedal lever.

6. The control supplemental feeder apparatus recited in claim 5, where the pedal lever configured for urging rotation in a second direction is configured with a torsion spring coaxial with respect to the hinge and where said torsion spring has a pedal tension rod extending from the torsion spring and engaging the pedal lever urging rotation in a second direction about an axis of said hinge that is parallel to the co-axis.

7. The control supplemental feeder apparatus as recited in claim 5, where the pedal lever configured for urging rotation in a second direction is configured with a distal end of the pedal lever opposite with respect to the pedal end of the pedal lever, where the pedal lever extends to the distal end on an opposing side of the hinge with respect to the pedal end and where the distal end is substantially heavier than the pedal end, thereby urging rotation in a second direction about an axis of said hinge that is parallel to the co-axis.

8. The control supplemental feeder apparatus recited in claim 2, comprising:
   a pedal lever pivotally attached to pivot about a hinge, where said hinge is attached between the left and right annular collar clamps where the pedal lever is configured for urging rotation in a second direction about an axis of said hinge that is parallel to the co-axis for engaging the hole with a locking member extending from the pedal lever.

9. The control supplemental feeder apparatus recited in claim 2, where the pair of left and right collar clamps are annular.

10. The control supplemental feeder apparatus recited in claim 2, where the pair of left and right collar clamps are circular segments.

11. A method for using a control supplemental feeder comprising:
placing a tubular collar over a feed line where the left and right opposing ends of the tubular collar includes left and right collar clamps spaced apart providing a gap there between, whereby the tubular collar is coaxial with respect to the left and right collar clamps and rotationally attached to the left and right collar clamps to rotate about a coaxis;
spring loading the tubular collar with a spring attached between the tubular collar and one of the left and right collars, and urging rotation of the tubular collar in a first rotation direction; and
rotating the tubular collar in the first rotation direction and thereby rotating an opening in a sidewall of the tubular collar in a first direction of rotation to a substantially horizontal position, where the opening in the sidewall extends through to and interior channel of the tubular collar.

12. The method as recited in claim 11, comprising:
rotating an extension tube having an entry opening communicable attached to the opening in the sidewall, where the extension tube has an interior extension channel communicably attached to an interior channel of the tubular collar.

13. The method as recited in claim 12, where spring loading is spring loading using a tension spring.

14. The method as recited in claim 11, where spring loading is spring loading using a torsion spring coaxial with respect to the tubular collar, where said torsion spring has a tension rod extending from the torsion spring to engage the tubular collar and urges rotation of the tubular collar in a first rotational direction.

15. The method as recited in claim 11, comprising:
urging rotation of a pedal lever in a second direction to pivot about an axis of a hinge that is parallel to the co-axis, and where said hinge is attached between the left and right annular collar clamps, thereby engaging a detent with a locking member extending from the pedal lever.

16. The method as recited in claim 15, where urging rotation of the pedal lever configured in a second direction is with a torsion spring coaxial with respect to the hinge and where said torsion spring has a pedal tension rod extending from the torsion spring and engaging the pedal lever urging rotation in a second direction about an axis of said hinge that is parallel to the co-axis.

17. The method as recited in claim 15, where urging rotation of the pedal lever in a second direction is with a pedal lever configured for urging rotation in a second direction with a distal end of the pedal lever opposite with respect to the pedal end of the pedal lever, where the pedal lever extends to the distal end on an opposing side of the hinge with respect to the pedal end and where the distal end is substantially heavier than the pedal end, thereby urging rotation in a second direction about an axis of said hinge.

18. The method as recited in claim 11, comprising:
urging rotation of a pedal lever in a second direction to pivot about an axis of a hinge that is parallel to the co-axis, and where said hinge is attached between the left and right annular collar clamps, thereby engaging a hole on an outer cylindrical surface of the tubular collar with a locking member extending from the pedal lever.

19. The method as recited in claim 11, where the pair of left and right collar clamps are annular.

20. The method as recited in claim 11, where the pair of left and right collar clamps are circular segments.

* * * * *